(12) United States Patent
Honda (10) Patent No.: US 7,783,795 B2
(45) Date of Patent: Aug. 24, 2010

(54) SERIAL COMMUNICATION CIRCUIT AND A/D CONVERSION SYSTEM HAVING THE SAME

(75) Inventor: Takuya Honda, Nagoya (JP)

(73) Assignee: DENSO CORPORATION, Kariya (JP)

( * ) Notice: Subject to any disclaimer, the term of this patent is extended or adjusted under 35 U.S.C. 154(b) by 981 days.

(21) Appl. No.: 11/581,443

(22) Filed: Oct. 17, 2006

(65) Prior Publication Data

US 2007/0088881 A1 Apr. 19, 2007

(30) Foreign Application Priority Data

Oct. 18, 2005 (JP) ............................. 2005-303051

(51) Int. Cl.
*G06F 13/00* (2006.01)
*G06F 13/12* (2006.01)
*H03M 1/00* (2006.01)
*H03M 1/72* (2006.01)

(52) U.S. Cl. ............................. 710/33; 710/68; 710/69; 341/142; 341/146

(58) Field of Classification Search .................... 710/33, 710/68, 69; 341/142, 146
See application file for complete search history.

(56) References Cited

U.S. PATENT DOCUMENTS

| | | | |
|---|---|---|---|
| 6,940,443 B2* | 9/2005 | Terazawa et al. ............ | 341/157 |
| 7,030,803 B2 | 4/2006 | Harada et al. | |
| 7,623,600 B2* | 11/2009 | Momtaz et al. ............. | 375/345 |
| 2005/0057388 A1* | 3/2005 | Terazawa et al. ............ | 341/157 |
| 2006/0041797 A1* | 2/2006 | Miyaji ........................ | 714/700 |

FOREIGN PATENT DOCUMENTS

JP A-2001-077800 3/2001

* cited by examiner

*Primary Examiner*—Niketa I Patel
(74) *Attorney, Agent, or Firm*—Posz Law Group, PLC

(57) ABSTRACT

A serial communication circuit for performing full duplex serial communication with a microcomputer includes a counter and a timer. The counter is incremented by each pulse of a serial clock signal output from the microcomputer. When the counter reaches the number of bits of serial data output from the microcomputer, the counter outputs a load signal to a receiving register. The timer starts to count after the counter outputs the receiving load signal for the first time and continues to count during the serial communication. The timer expires at a predetermined time interval. Each time the timer expires, the timer outputs a timer signal. In response to the timer signal, a synchronous signal is output to the microcomputer, the counter is cleared to zero, and data to be output to the microcomputer is loaded into a sending register.

2 Claims, 9 Drawing Sheets

FIG. 4A CS
FIG. 4B SCLK
FIG. 4C SIN
FIG. 4D SOUT
FIG. 4E COUNTER
FIG. 4F SYNCO
FIG. 4G TIMER
FIG. 4H SHIFT REGISTER
FIG. 4I RLOAD
FIG. 4J REGISTER 23
FIG. 4K SLOAD
FIG. 4L REGISTER 26

FIG. 7A $\overline{CS}$
FIG. 7B SCLK
FIG. 7C SIN
FIG. 7D SOUT
FIG. 7E COUNTER
FIG. 7F SYNCO
FIG. 7G TIMER
FIG. 7H SHIFT REGISTER
FIG. 7I RLOAD
FIG. 7J REGISTER 23
FIG. 7K SLOAD
FIG. 7L REGISTER 26

FIG. 9
PRIOR ART

SERIAL COMMUNICATION CIRCUIT AND A/D CONVERSION SYSTEM HAVING THE SAME

CROSS REFERENCE TO RELATED APPLICATION

This application is based on and incorporates herein by reference Japanese Patent Application No. 2005-303051 filed on Oct. 18, 2005.

FIELD OF THE INVENTION

The present invention relates to a serial communication circuit for performing full duplex serial communication with a microcomputer, and an analog-to-digital conversion system including the serial communication circuit, the microcomputer, and an analog-to-digital converter.

BACKGROUND OF THE INVENTION

Figure 9:
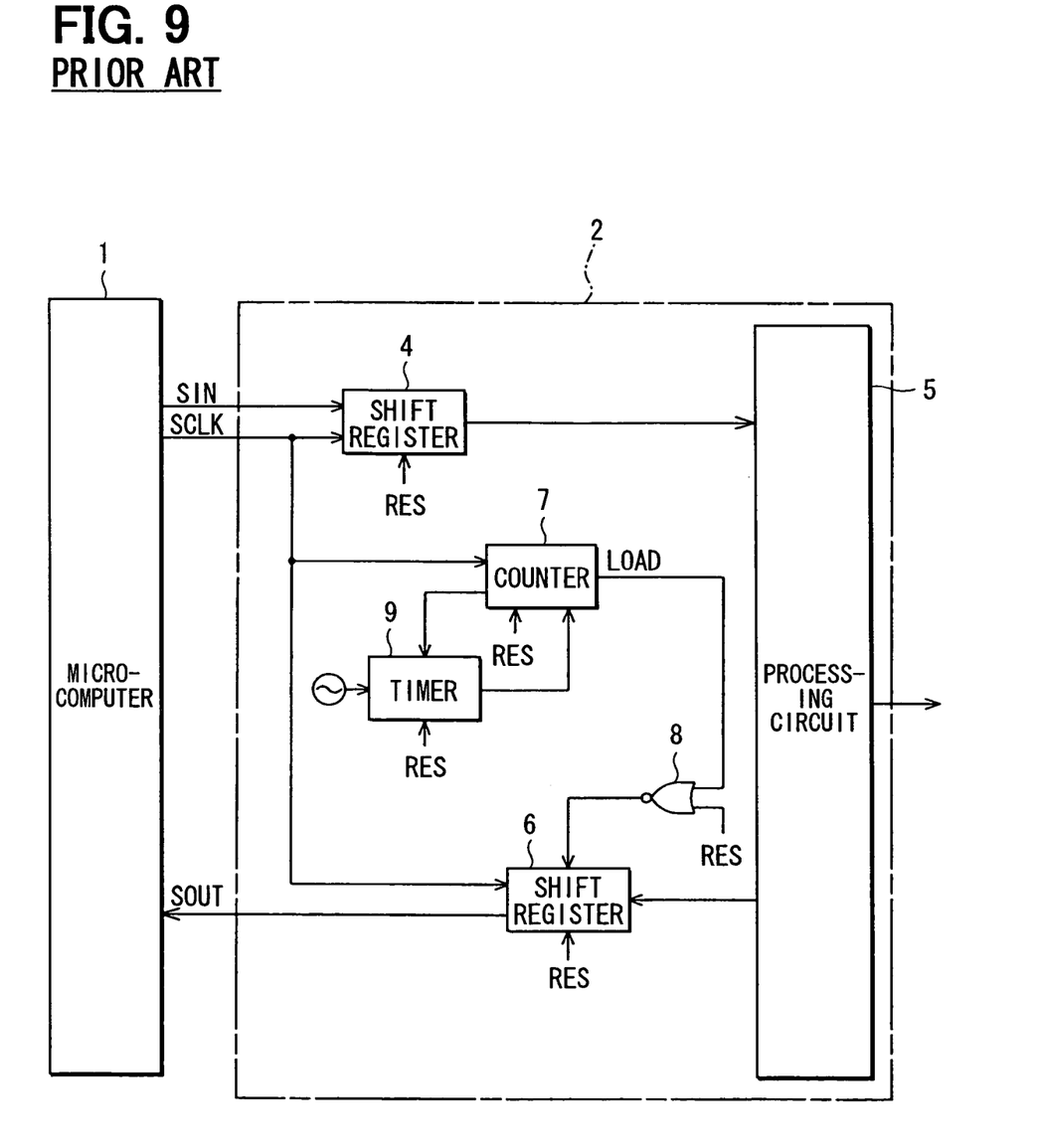
FIG. 9 is a block diagram of a conventional serial communication.

As shown in FIG. 9, a serial communication circuit disclosed in JP-2001-77800A includes a microcomputer 1 and an integrated circuit (IC) 2. The IC 2 has a receiving shift register 4, a processing circuit 5, a sending shift register 6, a counter circuit 7, a NOR gate 8, and a timer circuit 9.

The first bit of the serial clock signal SCLK output from the microcomputer 1 causes the timer circuit 9 to start to count. Then, the timer circuit 9 sends a clear signal to the counter circuit 7 at a predetermined time interval. The time interval is shorter than a transmission interval of a serial input data SIN and greater than a transmission time of the serial input data SIN. Thus, even when the counter circuit 7 stops to count due to a missing or extra pulse of the serial clock signal SCLK, the counter circuit 7 is cleared by the timer circuit 9 and the serial communication is returned to a normal state.

When an interrupt occurs in the microcomputer 1, the output timing of the serial clock signal SCLK may be delayed. In this case, the start timing of the timer circuit 9 is delayed accordingly. In contrast, data from the processing circuit is set into the shift register 6 at a constant time interval. As a result, the IC2 continues to output error data to the microcomputer 1.

SUMMARY OF THE INVENTION

In view of the above-described problem, it is an object of the present invention to provide a serial communication circuit in which an error condition caused by a delay in output timing of a serial clock signal supplied from an external device can be cleared, and an analog-to-digital conversion system that includes the serial communication circuit, a microcomputer as the external device, and an analog-to-digital converter.

A serial communication circuit includes a data counter that is incremented by each pulse of a serial clock signal output from a microcomputer. When the data counter reaches the number of bits of a serial data signal output from the microcomputer, the data counter outputs a receiving load signal to a receiving register.

The serial communication circuit includes a timer circuit that starts to count after the data counter outputs the receiving load signal for the first time and continues to count during the serial communication. The timer circuit expires at a predetermined time interval that is greater than a transmission time of the serial data signal and shorter than a transmission interval of the serial data signal. Each time the timer circuit expires, the timer circuit outputs a timer signal.

In response to the timer signal, a synchronous signal is output to the microcomputer, the data counter is cleared to zero, and data to be output to the microcomputer is loaded into a sending register.

Even when a pulse of the serial clock signal is missed or duplicated, the data counter is cleared to zero by the timer circuit. Thus, the next communication can be returned to the normal state.

Even when output timing of the serial clock signal and the serial data signal is delayed with respect to the synchronous signal, for example, due to an interrupt request occurred in the microcomputer, the data to be output to the microcomputer is loaded into the sending register in response to the timer signal. Thus, the next communication can be returned to the normal state.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
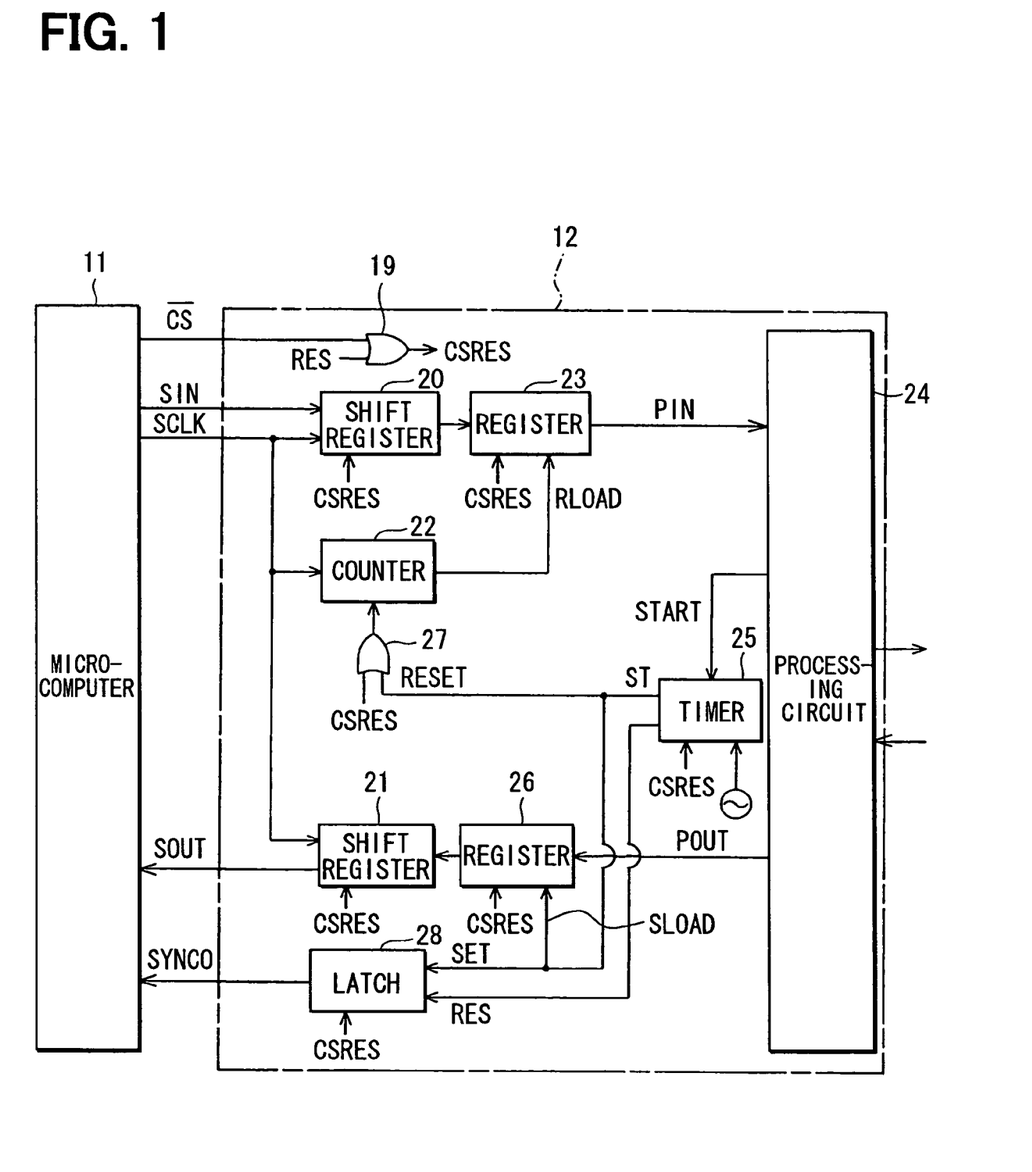
FIG. 1 is a block diagram of a serial communication circuit according to an embodiment of the present invention.
Figure 2:
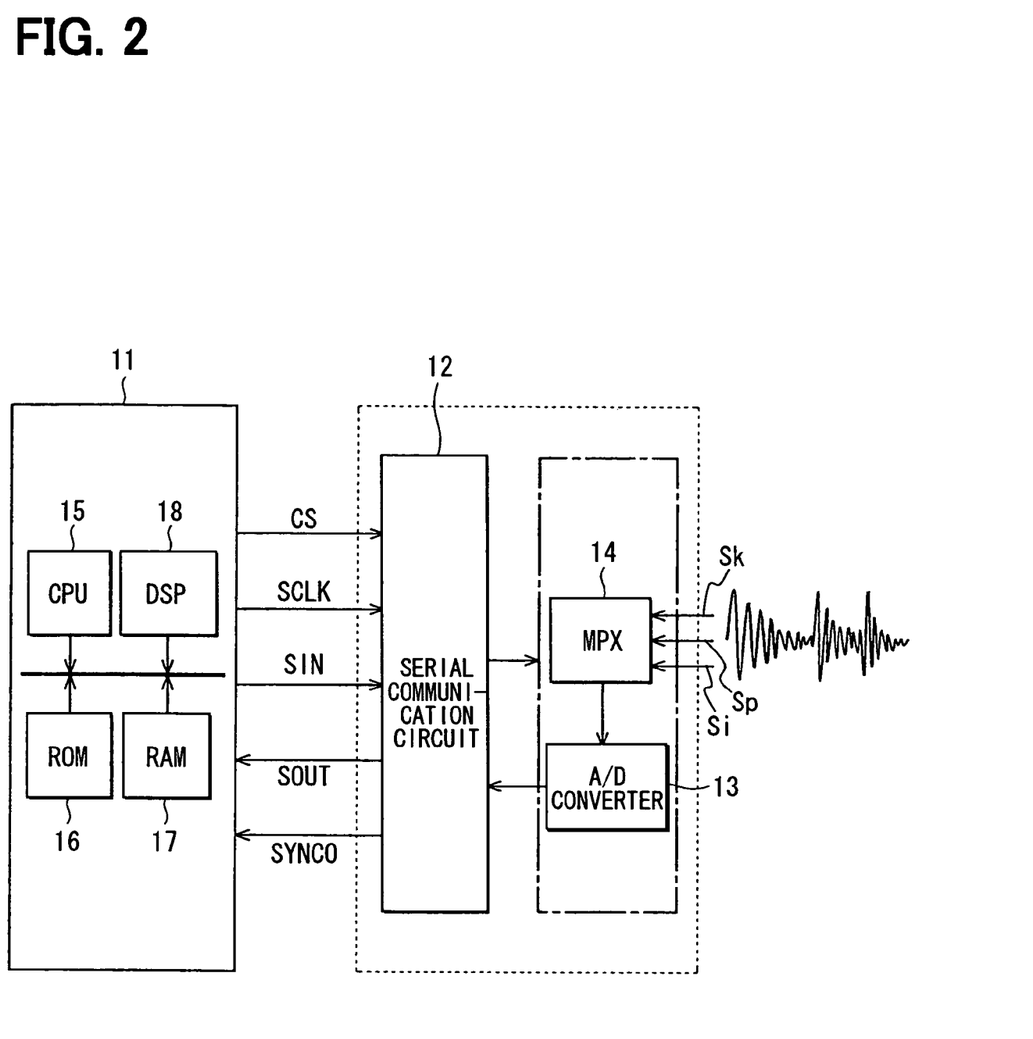
FIG. 2 is a block diagram of an analog-to-digital conversion system including the serial communication circuit of FIG. 1.

Referring to FIGS. 1 and 2, an analog-to-digital (A/D) conversion system includes a microcomputer 11, a serial communication circuit 12, an A/D converter 13, and a multiplexer (MPX) 14. The AND conversion system may be, for example, used to process analog signals from sensors connected to a vehicle engine.

As shown in FIG. 2, the microcomputer 11 has a central processing unit (CPU) 15, a read only memory (ROM) 16, a random access memory (RAM) 17, a digital signal processing circuit (DSP) 18 with a digital filter, and a serial interface circuit (not shown). The microcomputer 11 sends a chip select signal CS, a serial clock signal SCLK, and a serial data signal SIN to the serial communication circuit 12. The microcomputer 11 receives a synchronous signal SYNCO and a serial data signal SOUT from the serial communication circuit 12. The serial data signal SIN contains a control command to control the MPX 14.

The MPX 14 receives the analog sensor signals such as a knock signal Sk, a cylinder pressure signal Sp, and an ion current signal Si from the sensors through an amplifier circuit (not shown) with multiple gains. The ion current signal Si indicates a combustion condition in the engine. The MPX 14 forwards at least one of the knock signal Sk, the cylinder pressure signal Sp, and the ion current signal Si to the A/D converter 13 in accordance with the control command contained in the serial data signal SIN. The analog sensor signals are sent to the MPX 14 on each cylinder of the vehicle engine.

Although the analog sensor signals have different voltage levels, the gains of the amplifier circuit are switched by the microcomputer 11 according to types of the analog sensor signals. Thus, the voltage levels of the analog sensor signals are suitably adjusted for the MPX 14.

The A/D converter 13 converts the analog sensor signal to a parallel data signal POUT and sends the parallel data signal POUT to a processing circuit 24 of the serial communication circuit 12. The A/D converter 13 has a conversion time of 9 microseconds, for example. The A/D converter 13 has a known configuration, for example, disclosed in U.S. Pat. No. 7,030,803 corresponding to JP-A-2005-223818. The serial communication circuit 12, the A/D converter 13, and the MPX 14 are integrated into a single IC chip.

As shown in FIG. 1, the serial communication circuit 12 has a first OR gate 19, a receiving shift register 20, a sending shift register 21, a data counter 22, a receiving register 23, the processing circuit 24, a timer circuit 25, a sending register 26, a second OR gate 27, and a latch circuit 28.

The chip select signal CS is fed to a first terminal of the first OR gate 19 and a reset signal RES is fed to a second terminal of the first OR gate 19. The first OR gate 19 outputs a reset signal CSRES in response to the chip select signal CS or the reset signal RES. The chip select signal CS is active low and the reset signal CSRES is active high.

The serial data signal SIN is fed from the microcomputer 11 to the receiving shift register 20. The serial clock signal SCLK is fed from the microcomputer 11 to each of the receiving shift register 20, the sending shift register 21, and the data counter 22. The receiving shift register 20 converts the serial data signal SIN to a parallel data signal PIN and sends the parallel data signal PIN to the receiving register 23. The receiving register 23 loads the parallel data signal PIN synchronously with a receiving load signal RLOAD output from the data counter 22. The data counter 22 is incremented by each pulse of the serial clock signal SCLK. When the data counter 22 reaches the number (e.g., sixteen) of bits of the serial data signal SIN, the data counter 22 outputs the receiving load signal RLOAD to the receiving register 23.

The processing circuit 24 is a hard-wired logic circuit acting as an interface to the A/D converter 13. The processing circuit 24 receives the parallel data signal PIN from the receiving register 23, decodes the parallel data signal PIN into the control command, and outputs the control command to the MPX 14. The processing circuit 24 has means for latching the parallel data signal POUT output from the A/D converter 13.

The processing circuit 24 sends a start signal START to the timer circuit 25 upon the first receipt of the parallel data signal PIN. Then, the timer circuit 25 starts to count and expires at a first time interval T (e.g., 10 microseconds). The first time interval T is shorter than a transmission interval of the serial data signal SIN and greater than a transmission time of the serial data signal SIN. Each time the timer circuit 25 expires, the timer circuit 25 outputs a timer signal ST. The timer signal ST is fed to the sending register 26 as a sending load signal SLOAD, to the data counter 22 through the second OR gate 27 as a reset signal RESET, and to the latch circuit 28 as a set signal SET.

The processing circuit 24 outputs the parallel data signal POUT to the sending register 26. The sending register 26 loads the parallel data signal POUT synchronously with the sending load signal SLOAD and outputs the parallel data signal POUT to the sending shift register 21. The sending shift register 21 converts the parallel data signal POUT to the serial data signal SOUT and sends the serial data signal SOUT to the microcomputer 11 synchronously with the serial clock signal SCLK.

When the latch circuit 28 is set by the set signal SET, the latch circuit 28 asserts the synchronous signal SYNCO fed to the microcomputer 11.

The timer circuit 25 outputs a reset signal RES to the latch circuit 28 at a second time interval that is half of the first time interval T. Thus, the synchronous signal SYNCO is rectangle-shaped with a duty ratio of 0.5 at the first time interval T.

In the microcomputer 11, the DSP 18 performs waveform analysis of the serial data signal SOUT. The microcomputer 11 monitors the engine condition based on a result of the analysis.

When the microcomputer 11 is booted and sends the serial data signal SIN to the serial communication circuit 12 for the first time, the microcomputer 11 acts as a master. Thus, the microcomputer 11 initiates and controls the serial communication. After that, the serial communication circuit 12 acts as the master because the serial communication is controlled by the synchronous signal SYNCO output from the serial communication circuit 12.

Figure 3A:
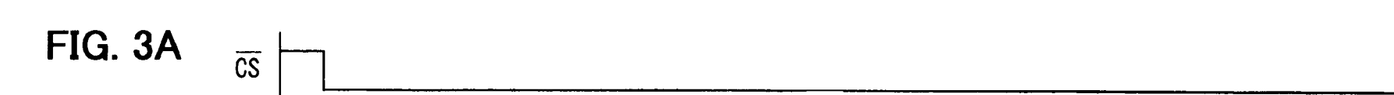
FIGS. 3A-3L are timing charts of a case where data is output to the serial communication circuit for the first time after a microcomputer is booted.

Referring to FIGS. 3A-8L, the A/D conversion system according to the embodiment works as follows:

FIGS. 3A-3L show a case where the microcomputer 11 sends the serial data SIN to the serial communication circuit 12 for the first time after the microcomputer 11 is booted. As long as the chip select signal CS is high, the serial communication circuit 12 is held in reset. The microcomputer 11 changes the chip select signal CS from high to low as shown in FIG. 3A and starts the serial communication with the serial communication circuit 12.

Figure 3B:
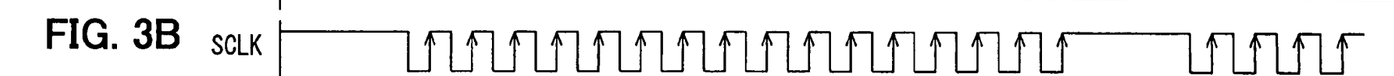
Figures 3C, 3D:
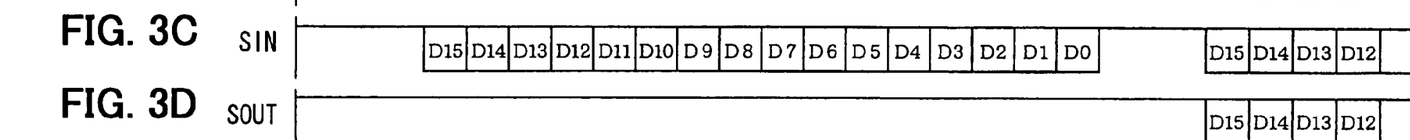

Then, the microcomputer 11 outputs the serial clock signal SCLK as shown in FIG. 3B and outputs the serial data signal SIN ranging from D15 (MSB) to D0 (LSB) synchronously with the rising edge of the serial clock signal SCLK as shown in FIG. 3C. The serial data signal SIN is stored in the receiving shift register 20 as shown in FIG. 3H.

Figure 3E:
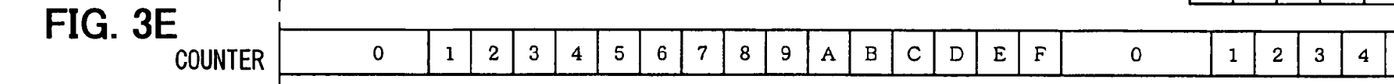
Figure 3F:
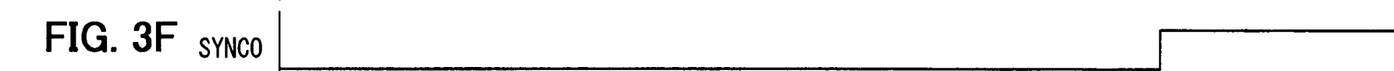
Figure 3G:
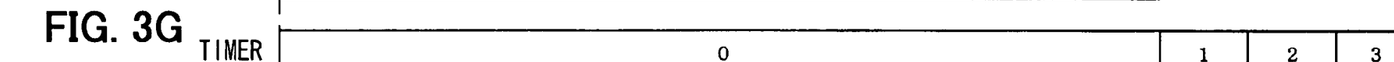
Figure 3H:
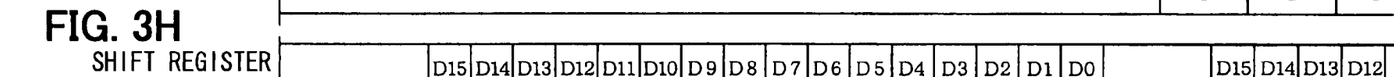
Figure 3I:
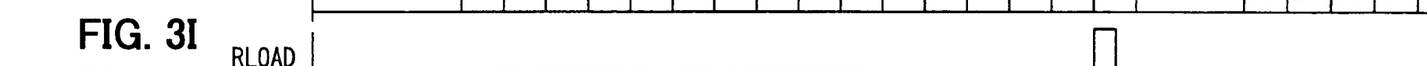
Figure 3J:
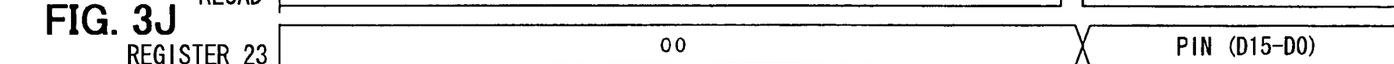

The data counter 22 is incremented by each pulse of the serial clock signal SCLK as shown in FIG. 3E. When the data counter 22 reaches the number (i.e. sixteen) of bits of the serial data signal SIN, i.e., the data counter 22 changes from F (hexadecimal digit) to 0, the data counter 22 outputs the receiving load signal RLOAD as a one shot pulse to the receiving register 23 as shown in FIG. 3I. Then, the receiving register 23 loads the parallel data signal PIN in response to the receiving load signal RLOAD as shown in FIG. 3J. The receiving register 23 outputs the parallel data signal PIN to the processing circuit 24. After the microcomputer 11 outputs the serial data signal SIN to the serial communication circuit 12 once, the microcomputer 11 temporarily stops the output of the serial clock signal SCLK as shown in FIG. 3B.

Figure 3K:
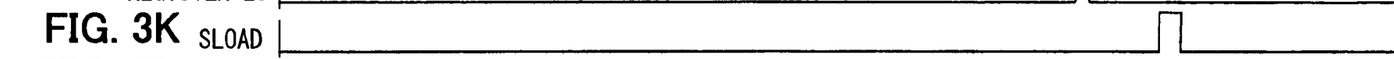
Figure 3L:
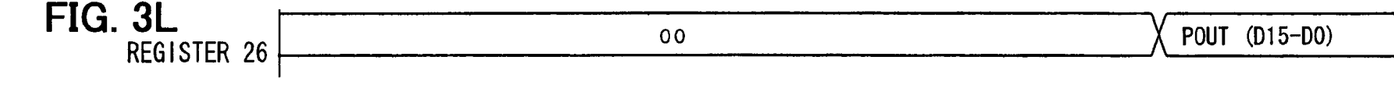

The processing circuit 24 outputs the start signal START to the timer circuit 25 upon the first receipt of the parallel data signal PIN. Then, the timer circuit 25 starts to count and expires at the first time interval T. Each time the timer circuit 25 expires, the timer circuit 25 outputs the timer signal ST. As shown in FIGS. 3G and 3K, when the timer circuit 25 starts to count and is incremented from 0 to 1, the timer circuit 25 outputs the timer signal ST so that the sending load signal SROAD is input to the sending register 26. The sending register 26 loads the parallel data signal POUT in response to the sending load signal SROAD as shown FIG. 3L. At the same time, the data counter 22 is cleared to zero as shown in FIG. 3E and the latch circuit 28 is set so that the synchronous signal SYNCO is changed to high as shown in FIG. 3F.

When the microcomputer 11 recognizes that the synchronous signal SYNCO is high, the microcomputer 11 restarts to output the serial clock signal SCLK and next serial data signal SIN as shown in FIGS. 3B and 3C. At the same time, the sending shift register 21 converts the digital data signal DS to the serial data signal SOUT and outputs the serial data signal SOUT to the microcomputer 11 as shown in FIG. 3D.

Figures 4A, 4B:
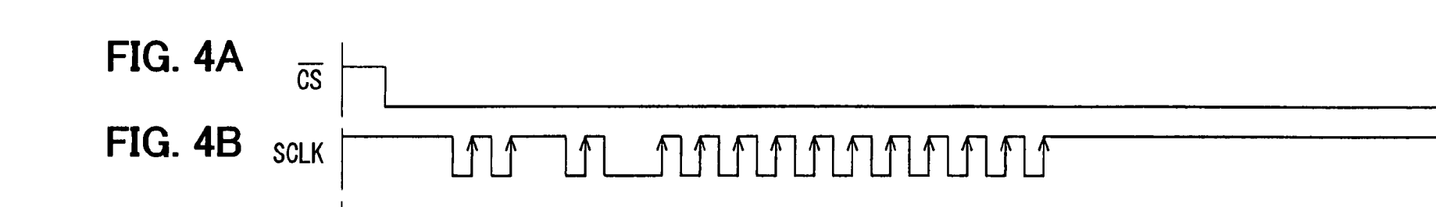
FIGS. 4A-4L are timing charts of a case where a missing pulse occurs in a serial clock signal in the first communication.
Figure 4C:
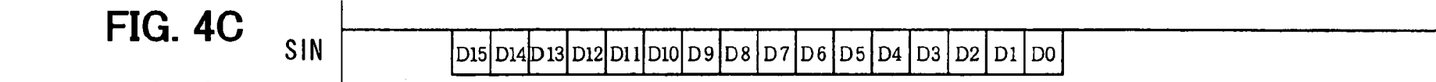
Figure 4D:
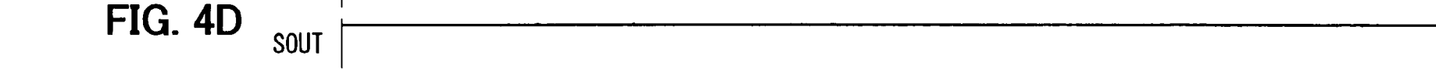
Figure 4E:
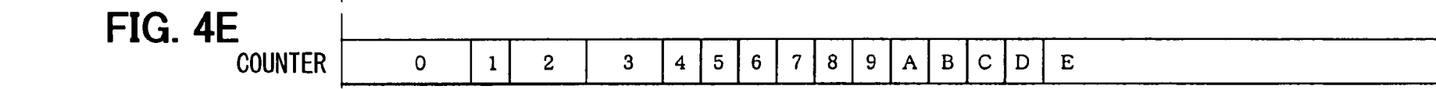
Figure 4F:
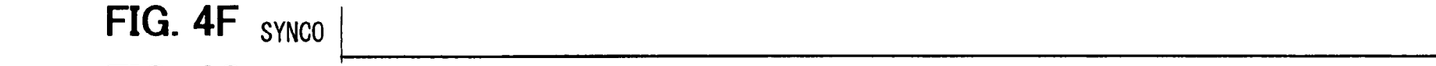
Figure 4G:
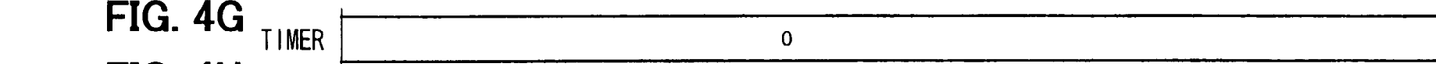
Figure 4H:
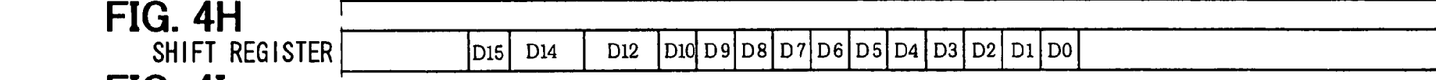
Figure 4I:
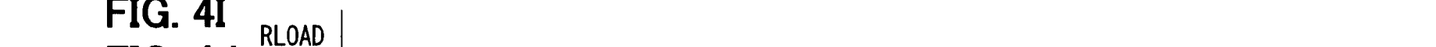
Figure 4J:
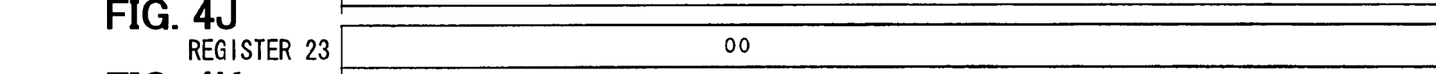
Figures 4K, 4L:
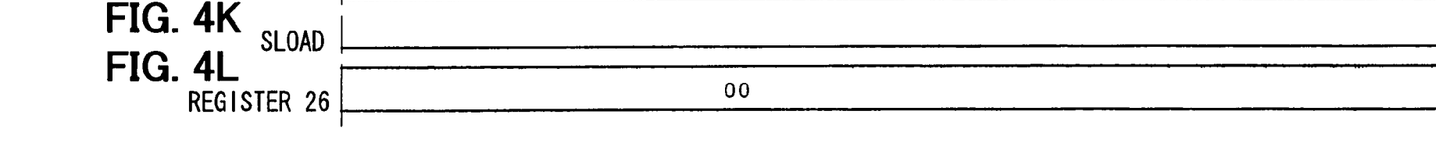

FIGS. 4A-4L show a case where two pulses of the serial clock signal SCLK are missed in the first communication. As shown in FIGS. 4B and 4C, the missing pulses correspond to bit D1 and bit D13 of the serial data signal SIN. In this case, the data counter 22 is incremented up to E as shown in FIG. 4E. Therefore, the data counter 22 does not output the receiving load signal RLOAD as shown in FIG. 4I. As a result, the receiving register 23 does not load the serial data signal SIN as shown in FIG. 4J.

As shown in FIG. 4F, the synchronous signal SYNCO is not asserted because the timer circuit 25 does not start to count. Therefore, the microcomputer 11 does not output the serial clock signal SCLK and the serial data SIN for next communication. In this case, after the microcomputer 11 recognizes that there is no response from the serial communication circuit 12, the microcomputer 11 changes the chip select signal CS from low to high in order to reset the serial communication circuit 12. Thus, the next communication is returned to the normal state.

Figure 5A:
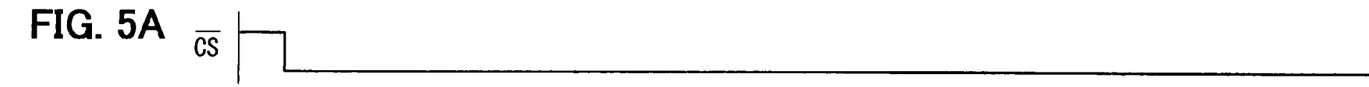
FIGS. 5A-5L are timing charts of a case where an extra pulse occurs in the serial clock signal in the first communication.
Figure 5B:
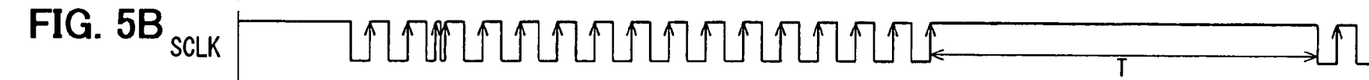
Figure 5C:
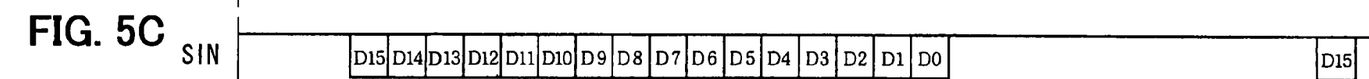
Figure 5D:
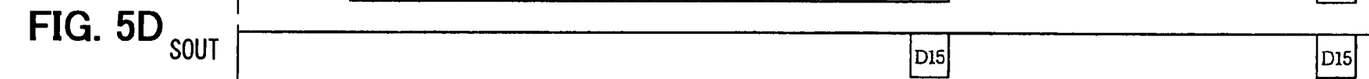
Figure 5E:
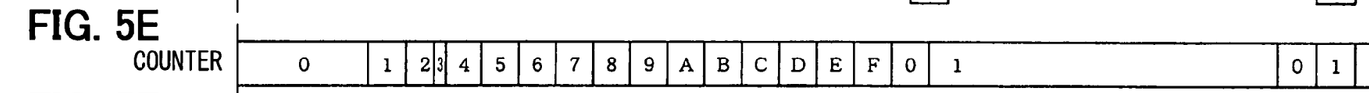
Figures 5F, 5G:
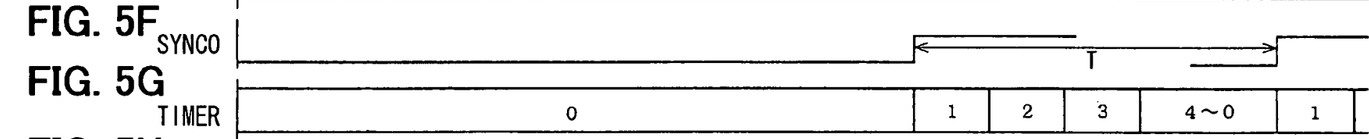
Figures 5H, 5I, 5J:
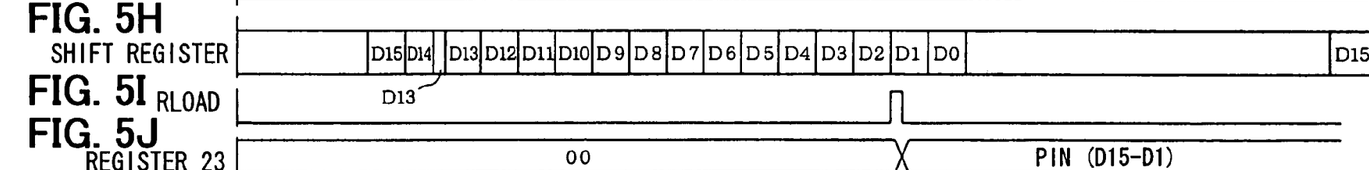
Figure 5K:
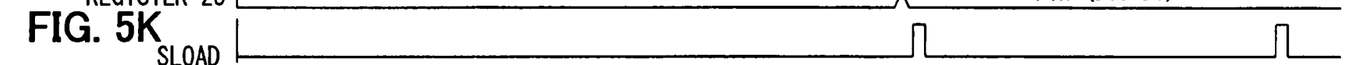
Figure 5L:
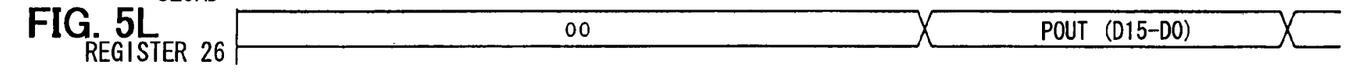

FIGS. 5A-5L show a case where an extra pulse of the serial clock signal SCLK is inserted in the first communication. As shown in FIGS. 5B and 5C, the pulse corresponding to bit D13 is duplicated twice. Therefore, when the data counter 22 changes from F to 0, the receiving register 23 loads the parallel data signal PIN ranging from D15 to D1 (i.e., bit D13 is duplicated), as shown in FIG. 5J. At the same time, the synchronous signal SYNCO is asserted as shown in FIG. 5F and the data counter 22 is cleared to zero as shown in FIG. 5E. Thus, the next communication is returned to the normal state.

When the processing circuit 24 decodes the parallel data signal PIN ranging from bit D15 to bit D1 into the control command, the control command disagrees with any control command used in the communication. Therefore, the processing circuit 24 can recognize that error occurs in the parallel data signal PIN.

Figure 6A:
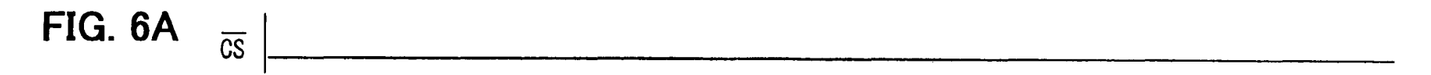
FIGS. 6A-6L are timing charts of a case where the missing pulse occurs in the serial clock signal in the second or later communication.
Figure 6B:
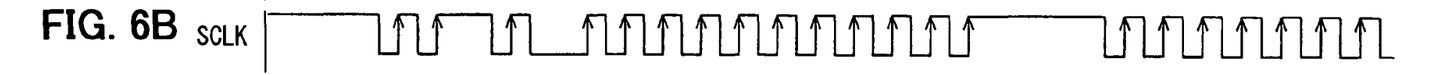
Figure 6C:
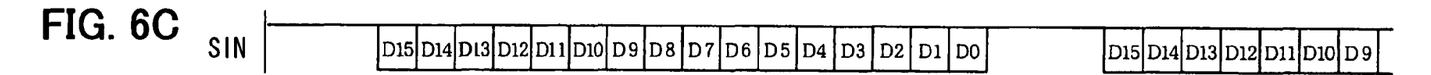
Figure 6D:
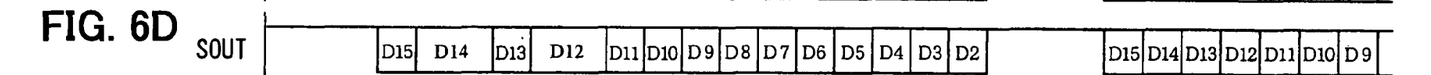
Figure 6E:
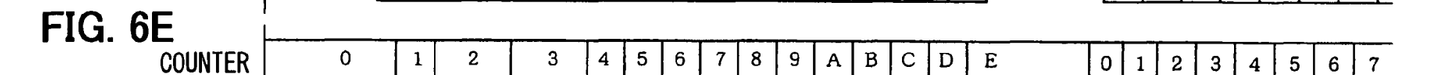
Figure 6F:
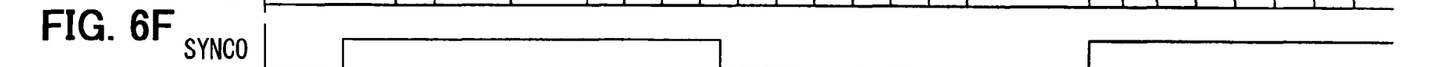
Figure 6G:
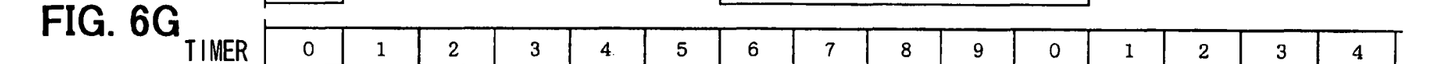
Figures 6H, 6I:
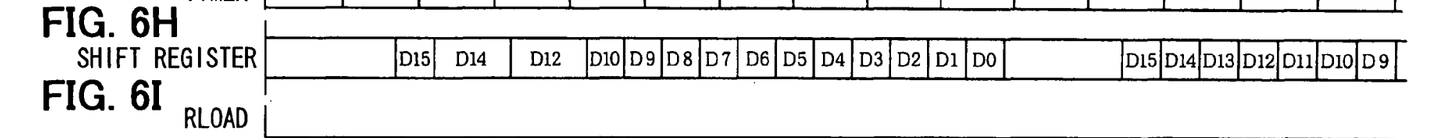
Figure 6J:
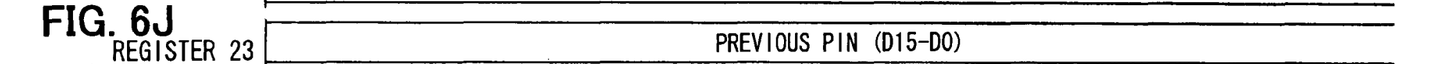
Figure 6K:
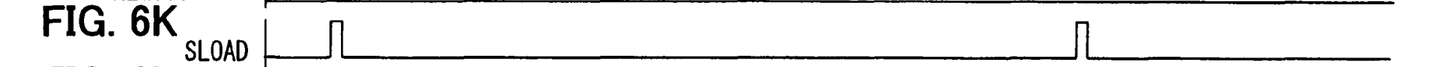
Figure 6L:
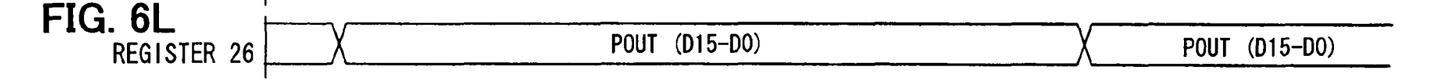

FIGS. 6A-6L show a case where two pulses of the serial clock signal SCLK are missed in the second or later communication. As shown in FIGS. 6B and 6C, the missing pulses correspond to bit D11 and bit D13 of the serial data signal SIN. In this case, the data counter 22 is incremented up to E as shown in FIG. 6E. Therefore, the data counter 22 does not output the receiving load signal RLOAD as shown in FIG. 6I. As a result, the receiving register 23 does not load the parallel data signal PIN so that previous parallel data PIN remains in the receiving register 23 as shown in FIG. 6J.

Since the two pulses of the serial clock signal SCLK are missed, the serial data signal SOUT ranging from bit D15 to bit D2 is input to the microcomputer 11 as shown in FIG. 6D.

In this case, the timer circuit 25 continues to count as shown in FIG. 6G and outputs the timer signal ST at the first interval T. Thus, the data counter 22 is cleared to zero as shown in FIG. 6E and the synchronous signal SYNCO is asserted as shown in FIG. 6F. As a result, the next communication is returned to the normal state.

The processing circuit 24 can recognize that the error occurs in the communication because the processing circuit 24 does not receive the parallel data signal PIN within a predetermined time period. When the processing circuit 24 recognizes that the error occurs in the communication, the processing circuit 24 sends an error message to the microcomputer 11. Thus, the microcomputer 11 can recognize that the error occurs in the serial data signal SOUT.

Figure 7A:
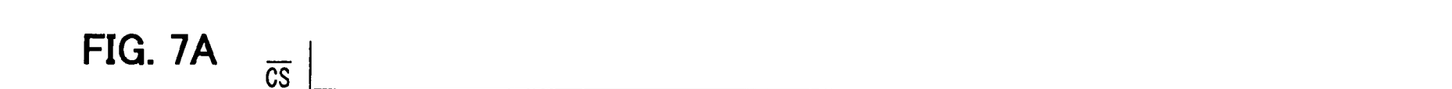
FIGS. 7A-7L are timing charts of a case where the extra pulse occurs in the serial clock signal in the second or later communication.
Figure 7B:
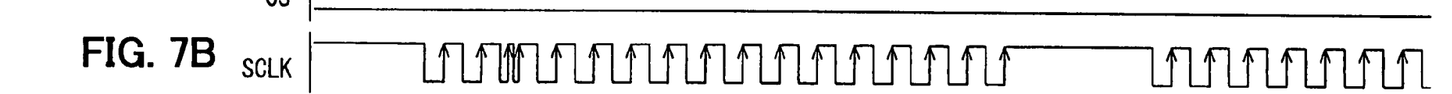
Figure 7C:
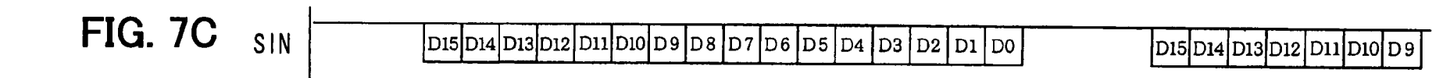
Figures 7D, 7E:
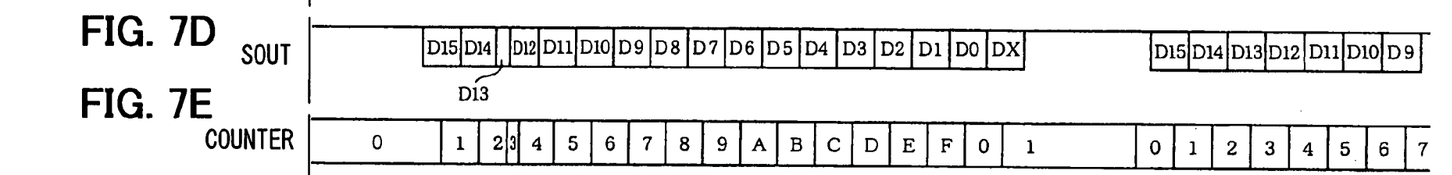
Figure 7F:
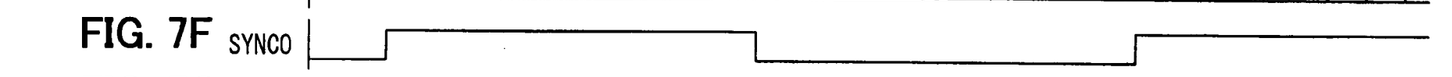
Figures 7G, 7H, 7I, 7J:
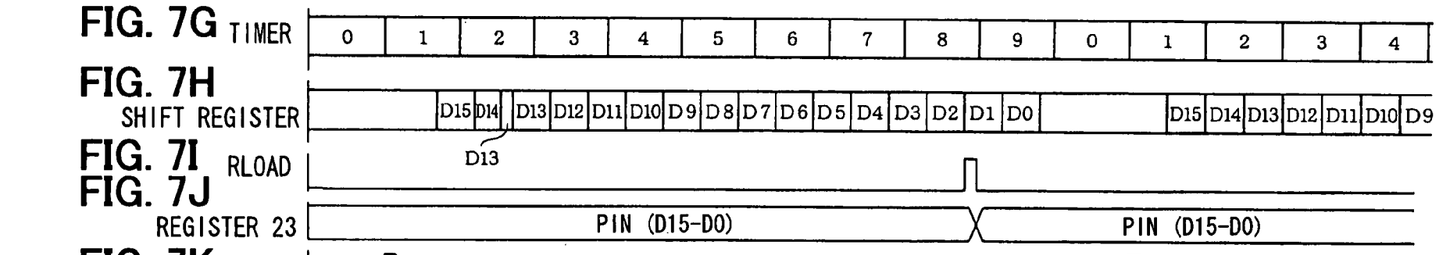
Figures 7K, 7L:
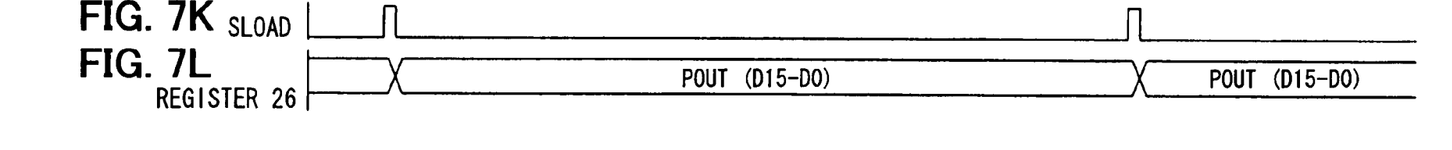

FIGS. 7A-7L show a case where an extra pulse of the serial clock signal SCLK is inserted in the second or later communication. As shown in FIGS. 7B and 7C, the pulse corresponding to bit D13 is duplicated twice. Therefore, when the data counter 22 changes from F to 0, the receiving register 23 loads the parallel data signal PIN ranging from bit D15 to bit D1 (i.e., bit D13 is duplicated) as shown in FIG. 7J.

When the processing circuit 24 decodes the parallel data signal PIN ranging from bit D15 to bit D1 into the control command, the control command disagrees with any control command used in the communication. Therefore, the processing circuit 24 can recognize that error occurs in the parallel data signal PIN.

Due to the extra pulse, a meaningless bit DX is pushed into the serial data signal SOUT and bit D15 is pushed out as shown in FIG. 7D. In this case, the timer circuit 25 continues to count as shown in FIG. 7G and outputs the timer signal ST at the first time interval T. Thus, the data counter 22 is cleared to zero as shown in FIG. 7E and the synchronous signal SYNCO is asserted as shown in FIG. 7F. As a result, the next communication is returned to the normal state.

The processing circuit 24 can recognize that the error occurs in the communication because the processing circuit 24 does not receive the parallel data signal PIN within the predetermined time period. When the processing circuit 24 recognizes that the error occurs in the communication, the processing circuit 24 sends the error message to the microcomputer 11. Thus, the microcomputer 11 can recognize that the error occurs in the serial data signal SOUT.

Figure 8A:
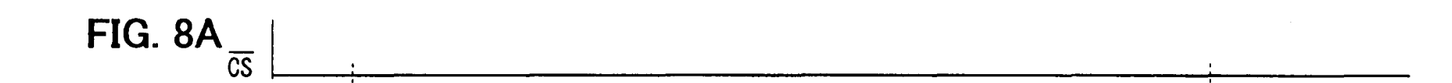
FIGS. 8A-8L are timing charts of a case where output timing of the serial clock signal is delayed with respect to a synchronous signal.
Figure 8B:
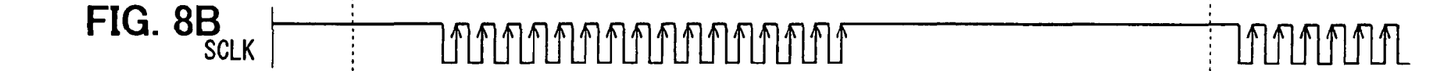
Figure 8C:
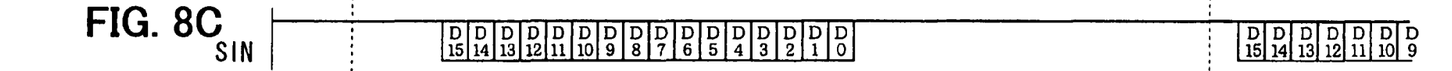
Figure 8D:
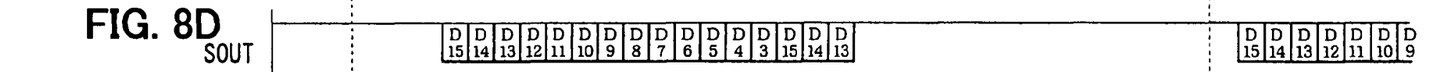
Figure 8E:
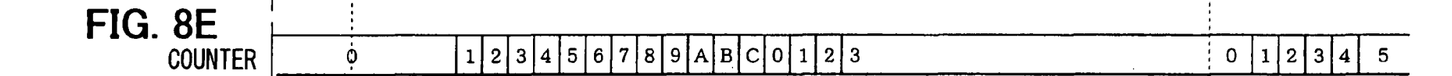
Figure 8F:
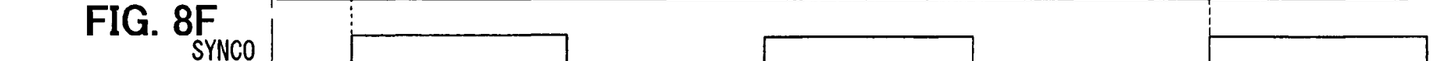
Figure 8G:
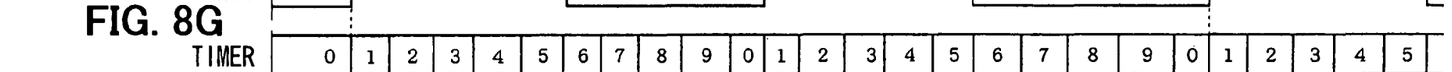
Figure 8H:
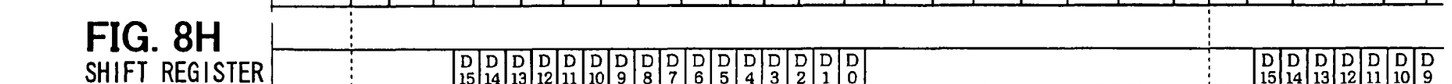
Figure 8I:
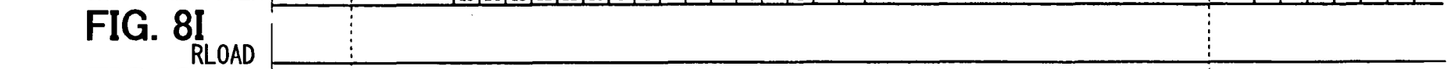
Figure 8J:
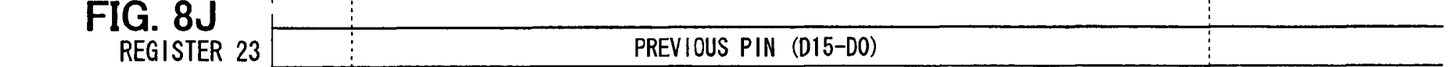
Figure 8K:
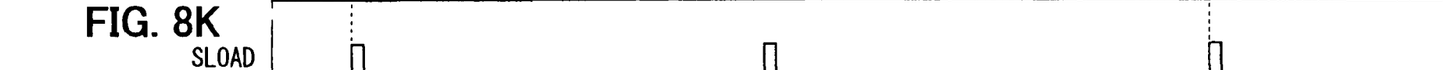
Figure 8L:
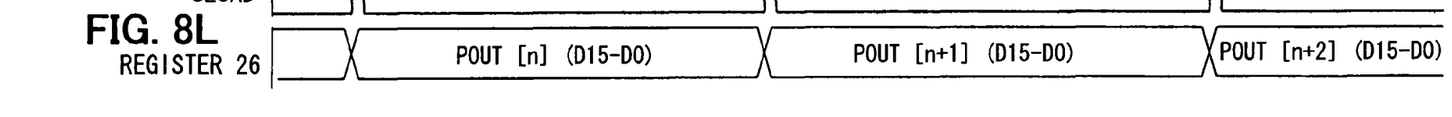

FIGS. 8A-8L show a case where the output timing of the serial clock signal SCLK and the serial data signal SIN is delayed with respect to the rising edge of the synchronous signal SYNCO. Due to the delay, when the data counter 22 is incremented to C, the timer circuit 25 expires as shown in FIG. 8G. As a result, the synchronous signal SYNCO is asserted as shown in FIG. 8K and the data counter 22 is cleared to zero as shown in FIG. 8E. Therefore, the data counter 22 does not output the receiving load signal RLOAD as shown in FIG. 8I. As a result, the receiving register 23 does not load the parallel data signal PIN so that the previous parallel data PIN remains in the receiving register 23 as shown in FIG. 8J.

Due to the delay, the Nth serial data signal SOUT consists of bits D15-D3 of Nth parallel data signal POUT[N] and bits D15-D13 of (N+1)th parallel data signal POUT[N+1] as shown in FIG. 8D, where N is a positive integer. Then, the data counter 22 is cleared to zero and the synchronous signal SYNCO is asserted when the timer circuit 25 expires. Thus, the next communication is returned to the normal state.

According to the embodiment, the serial communication circuit 12 includes the data counter 22 that is incremented by each pulse of the serial clock signal SCLK. When the data counter 22 reaches the number of bits of the serial data signal SIN, the data counter 22 outputs the receiving load signal RLOAD to the receiving register 23.

The serial communication circuit 12 includes the timer circuit 25 that starts to count after the data counter 22 outputs the receiving load signal RLOAD for the first time and continues to count during the serial communication. The timer circuit 25 expires at the first time interval. Each time the timer circuit 25 expires, the timer circuit 25 outputs the timer signal ST.

In response to the timer signal, the synchronous signal SYNCO is output to the microcomputer 11, the data counter 22 is cleared to zero, and the parallel data signal POUT is loaded into the sending register 26.

Even when the pulse of the serial clock signal SCLK is missed or duplicated, the data counter 22 is cleared to zero by the timer circuit 25. Thus, the next communication can be returned to the normal state.

Even when the output timing of the serial clock signal SCLK and the serial data signal SIN is delayed with respect to the synchronous signal SYNCO, for example, due to overload of the microcomputer 11, the parallel data signal POUT is loaded into the sending register 26 in response to the timer signal ST output from the timer circuit 25. Thus, the next communication can be returned to the normal state.

The serial data signal SIN contains the control command to control the MPX 14 that controls the A/D converter 13. The serial communication circuit 12 converts the serial data signal SIN to the parallel data signal PIN, decodes the parallel data signal PIN into the control command, and outputs the control command to the MPX 14. The serial communication circuit 12 receives the parallel data signal POUT from the A/D converter 13, converts the parallel data signal POUT to the serial data signal SOUT, and outputs the serial data signal SOUT to the microcomputer 11.

Thus, the microcomputer 11 continuously monitors the vehicle engine condition. Therefore, the serial communication needs to be returned to the normal state as soon as possible, when the error occurs due to noise or the like. The serial communication circuit 12 can return the serial communication to the normal state promptly.

The embodiment described above may be modified in various ways. For example, the number of bits of the serial data signals SIN, SOUT can be variable.

The conversion time of the AND converter 13 can be variable.

The A/D conversion system may be used for other application than the monitoring of the vehicle engine.

The microcomputer 11 may control other device than the A/D converter 13.

Such changes and modifications are to be understood as being within the scope of the present invention as defined by the appended claims.

What is claimed is:

1. A serial communication circuit that performs full duplex serial communication with a microcomputer based on a clock signal output from the microcomputer, the serial communication circuit comprising:
a first register that loads first serial data in response to a first load signal, the first serial data being output from the microcomputer synchronously with the clock signal;
first means that performs processing based on the loaded first serial data;
second means that outputs a synchronous signal to the microcomputer at a first time interval greater than a transmission time of the first serial data, the synchronous signal causing the microcomputer to output next first serial data;
a second register that loads second serial data in response to a second load signal, the second serial data being generated based on a result of the processing;
third means that outputs the loaded second serial data to the microcomputer in response to the second load signal;
a counter circuit that is incremented by each pulse of the clock signal and outputs the first load signal to the first register when reaches the number of bits of the first serial data, the counter circuit being reset in response to the second load signal; and
a timer circuit that starts to count after the counter circuit outputs the first load signal for the first time and continues to count during the serial communication, the timer circuit expiring at a second time interval that is greater than the transmission time of the first serial data and shorter than a transmission interval of the first serial data, wherein
the timer circuit outputs the second load signal each time the timer circuit expires.

2. An analog to digital conversion system comprising:
the serial communication circuit of claim 1;
the microcomputer of claim 1; and
an analog to digital converter that converts at least one of a plurality of analog signals into a digital signal in accordance with a control signal output from the serial communication circuit and outputs the digital signal to the serial communication circuit, wherein
the microcomputer outputs a command signal corresponding to the control signal to the serial communication circuit, and
the serial communication circuit generates the control signal based on the command signal and outputs the digital signal to the microcomputer.

* * * * *